United States Patent [19]
Walker

[11] Patent Number: 5,901,230
[45] Date of Patent: May 4, 1999

[54] HANDS-FREE COMMUNICATION METHOD FOR A MULTICHANNEL TRANSMISSION SYSTEM

[75] Inventor: Michael Walker, Baltmannsweiler, Germany

[73] Assignee: Alcatel N.V., Netherlands

[21] Appl. No.: 08/647,306

[22] Filed: May 9, 1996

[30] Foreign Application Priority Data

May 12, 1995 [DE] Germany .......................... 195 17 469

[51] Int. Cl.⁶ .................................................. H04B 3/20
[52] U.S. Cl. .......................... 381/66; 381/104; 379/388
[58] Field of Search ................................ 381/71, 66, 106, 381/102, 107, 104; 379/390, 388, 389, 410, 406

[56] References Cited

U.S. PATENT DOCUMENTS

| 4,039,753 | 8/1977 | Balogh et al. . | |
|---|---|---|---|
| 4,891,837 | 1/1990 | Walker et al. | 379/390 |
| 5,359,653 | 10/1994 | Walker | 379/390 |

FOREIGN PATENT DOCUMENTS

| 0503660 | 9/1992 | European Pat. Off. . |
|---|---|---|
| 0627825 | 12/1994 | European Pat. Off. . |
| 3724346 | 11/1988 | Germany . |
| 3822353 | 9/1989 | Germany . |
| 4111820 | 6/1992 | Germany . |
| 4130045 | 3/1993 | Germany . |
| 4222465 | 1/1994 | Germany . |
| 4229912 | 3/1994 | Germany . |
| 4305256 | 8/1994 | Germany . |
| 4407102 | 3/1995 | Germany . |
| 4337653 | 5/1995 | Germany . |

OTHER PUBLICATIONS

"A Compact Multi–Channel Echo Canceller with a Single Adaptive Filter Per Channel" by Hirano et al, pp. 1922–1925, Proc. ISCAD 1992, IEEE.

*Primary Examiner*—Minsun Oh Harvey
*Attorney, Agent, or Firm*—Ware, Fressola, Van Der Sluys & Adolphson LLP

[57] ABSTRACT

With hands-free communication methods for stereophonic hands-free communication to transmit room acoustics, and with multichannel hands-free communication to reproduce different speaker locations at a conference table, the acoustical couplings between loudspeakers and microphones located in the room must especially be taken into consideration, in addition to the influence of ambient noise and the control of duplex communication situations. The $n_2$ couplings take place in n-channel transmission systems. According to the invention, for each coupling, a coupling factor (dlm) is formed from the quotient of a short-term average value of the transmitted signal (ysam) assigned to a microphone, and the short-term average value of the received signal (xsam) assigned to a loudspeaker. With the coupling factor (dlm) weighted with the short-term average value (xsam), the transmission curve of a compander (1.1, 1.2) is automatically and briefly shifted in a way, so that ambient noise and echoes are suppressed in each transmission channel, and only the speech signal is transmitted.

6 Claims, 7 Drawing Sheets

HANDS-FREE COMMUNICATION METHOD FOR A MULTICHANNEL TRANSMISSION SYSTEM

TECHNICAL FIELD

The invention concerns a hands-free communication method for a multichannel transmission system, namely for stereophonic hands-free communication to transmit room acoustics, and for multichannel hands-free communication to reproduce different speaker locations at a conference table, or for conferences wherein a number of subscribers from several locally separated rooms are switched together.

BACKGROUND OF THE INVENTION

In a single channel transmission system, for example a hands-free communication installation for telephones, a number of problems have already been addressed, which result from the coupling between loudspeaker and microphone, from the influence of the ambient noise and control of the duplex communication situation.

Thus, for example, a circuit arrangement for dynamic control of a terminal is known, where a controllable dynamic compander adapts the amplification factor of the signal voltages produced by a microphone to the voltage value of these signal voltages, see DE 37 24 346 A1. This achieves that several persons using the hands-free communication device of a subscriber affect the subscriber on the opposite side, as if they were located at the same distance from the terminal, and as if they were speaking at the same loudness, while interference noise sources barely have any effect on the transmission and the disturbing acoustical liveliness is avoided.

Furthermore, a method for improving the transmission properties of an electrical-to-acoustical installation is known, whereby the position of the compander curve is automatically controlled, see DE 42 29 912 A1. This detects whether the transmitted signal is derived from speech or from noise, and where the control magnitude produced by means of the voice and noise recognition for the compander curve achieves that the speech being transmitted is sent at a constant level, that the received loudness level is raised with increasing ambient noise, and that the noise level is lowered for the transmission.

A further improvement of the quality of hands-free communication is achieved, if the compander is preceded by a controlled echo compensator, or is followed by a voice-controlled balance, see DE 43 05 256 A1.

Finally, a method has already been proposed, whereby the current coupling between loudspeaker and microphone is determined, to attain the desired echo attenuation required by the system, with as little influence on the quality of the duplex communication as possible.

Although many problems are known with single channel hands-free communication, and have also been partly solved, the solutions cannot be used directly with multi-channel transmission systems, since multichannel transmission systems must take multiple couplings into consideration between the loudspeakers and microphones in the same room. It is noted that $n^2$ couplings take place with n-channel transmission systems. An arrangement for a two-channel transmission system is known, wherein an echo compensator is used for each channel, see Hirano A., Sugiyama A.: A Compact Multi-Channel Echo Canceller with a Single Adaptive Filter per Channel. Proc. ISCAS 1992, San Diego, Calif., 1992, pages 1922 to 1925. Each echo compensator is designed with an adaptive digital filter. The publication describes that when four adaptive filters are used, there is no clear optimum solution for the adjustment of the filter coefficients, to compensate for the echoes derived from the four possible couplings. The indicated solution with two digital filters is based on that one digital filter is switched on as a function of the input signal from the right and the left loudspeaker, and the pulse response at the right microphone is evaluated by the right and the left loudspeaker. However, the computation of the filter coefficient is only correct if a microphone receives signals from one loudspeaker only. The evaluation of composite or differential signals described herein gives rise to the danger of erroneous measurements, and can result in system instability. Furthermore, the use of digital filters in multichannel transmission systems is very costly, since for example nine filters must be figured for a three-channel system. For example, the required working speed of a computer with a scanning rate of 24 kHz and a filter length of 1000 coefficients, according to a time window of 41 ms, is 864 million instructions per second.

In addition, a multichannel transmission system is known, wherein one digital filter is used for each loudspeaker and microphone, see FP 627 825 A2. To compute the filter coefficients in that case, a detector circuit selects the channel in which the signal with the largest output occurs. To limit the expense of this solution, a compromise is made between the number of adaptive filters and the gain in quality through echo compensation.

SUMMARY OF THE INVENTION

The task now exists to present a hands-free communication method for a multichannel transmission system, which can get by without the use of adaptive digital filters and which considers all coupling possibilities between loudspeakers and microphones at less cost than the already known solutions, and whereby a natural conversation between several persons is made possible.

According to the invention, this task is fulfilled by a method for a multichannel transmission system comprising a plurality of transmit channels each including a microphone as an acoustical-to-electrical transducer and a plurality of receive channels each including a loudspeaker as an electrical-to-acoustical transducer, said hands-free communication method using a controllable compander in each transmit channel to determine the magnitude of the transmit gain and a coupling estimator for single-channel transmission which serves to determine the acoustic coupling between loudspeaker and microphone, characterized in that between each microphone and each loudspeaker the respective acoustic coupling factors and the respective coupling factors determined for a microphone are weighted with the short-time average value of the received signal of the loudspeaker associated with the respective coupling factor, and that the maximum value determined therefrom serves as a control quantity for the transfer function of the respective compander associated with the transmit channel of each microphone, so that the gain of each transmit channel is controlled separately. It is also fulfilled by a circuit arrangement for carrying out a hands-free communication method for a multichannel transmission system using controllable companders and coupling estimators, characterized in that each transmit channel is connected via an absolute-value device and an integrator to a summer having its output coupled to the respective receive amplifiers of the receive channels through a further integrator, that each receive channel is connected via an absolute-value device and an integrator to a weighting circuit having its output coupled to the coupling estimators associated with the respective transmit channels, each of said coupling estimators having its outputs connected to an associated maximum-value decision circuit, and that the output of the maximum-value decision circuit is coupled to the control input of the compander which determines the respective gain of the transmit channel.

The invention provides a cost-effective hands-free communication method for a multichannel system. The essence of the invention is that from the number of possible coupling factors between loudspeakers and microphones, the largest current coupling factor is respectively determined by explicit decision conditions, to adjust the transmission function of a compander. Since the individual coupling factors are available separately, an optimum adjustment of the microphone sensitivity for duplex and receiving operation is possible. The noise suppression of each microphone allows the realization of systems with large numbers of subscribers, without deteriorating the signal-to-noise ratio. The acoustical liveliness, which takes place through acoustic coupling of the speaker to neighboring microphones, is also lowered.

BRIEF DESCRIPTION OF THE DRAWINGS

The invention is explained in the following with a configuration example. The pertinent drawings illustrate.

BEST MODE FOR CARRYING OUT THE INVENTION

Figure 1:
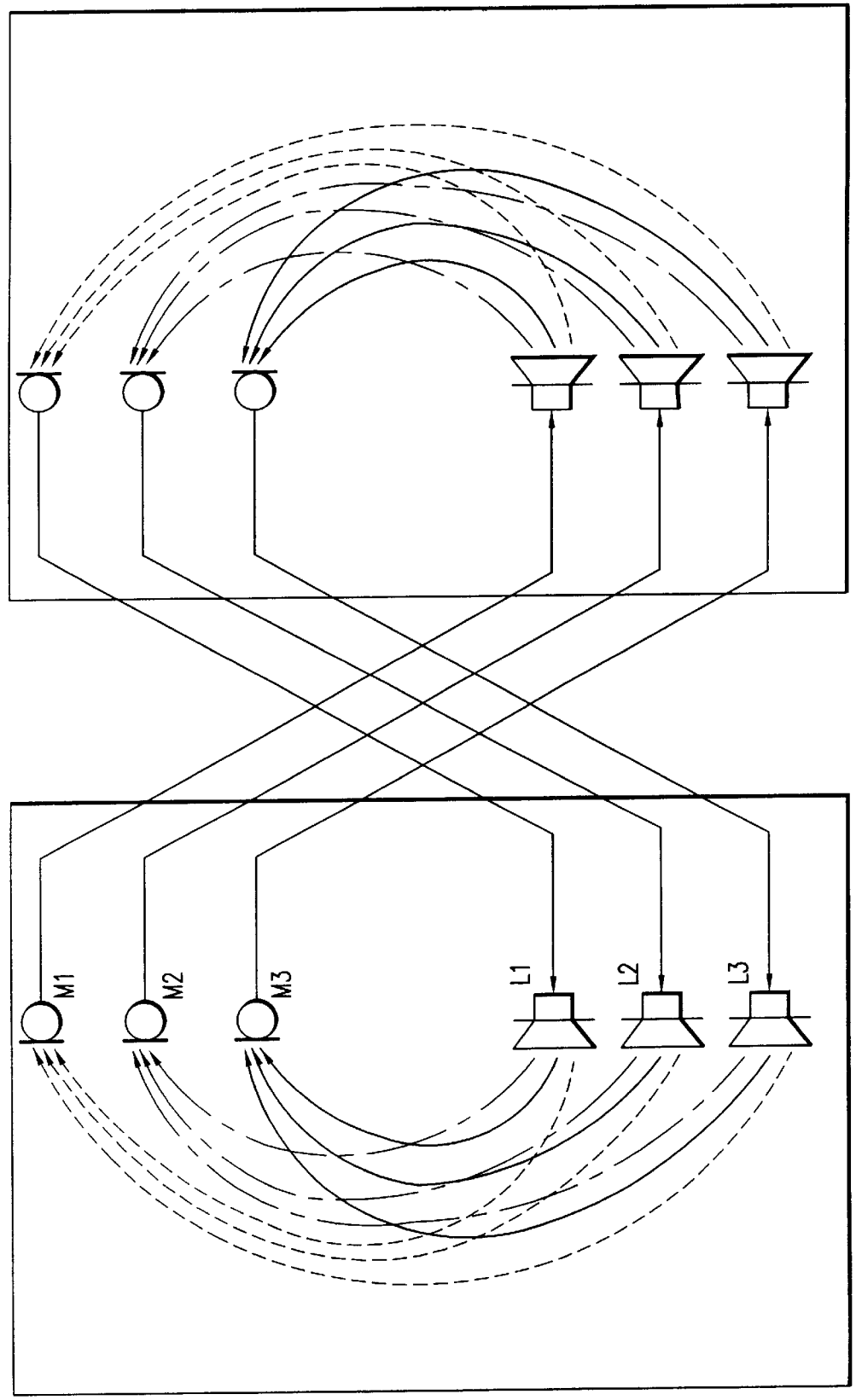
FIG. 1 an arrangement for a three-channel transmission system.

To illustrate the problems with a hands-free communication method for multichannel transmission systems, FIG. 1 depicts a three-channel transmission system between a first room and a second room, where the first room contains three microphones M1, M2, M3 and three loudspeakers L1, L2, L3, between which is a total of nine couplings. A significant task, which is fulfilled by the method according to the invention, comprises determining the couplings in such a way, that the stability of the system is ensured and a natural conversation can take place between the subscribers in the first room and those in the second room.

Figure 2:
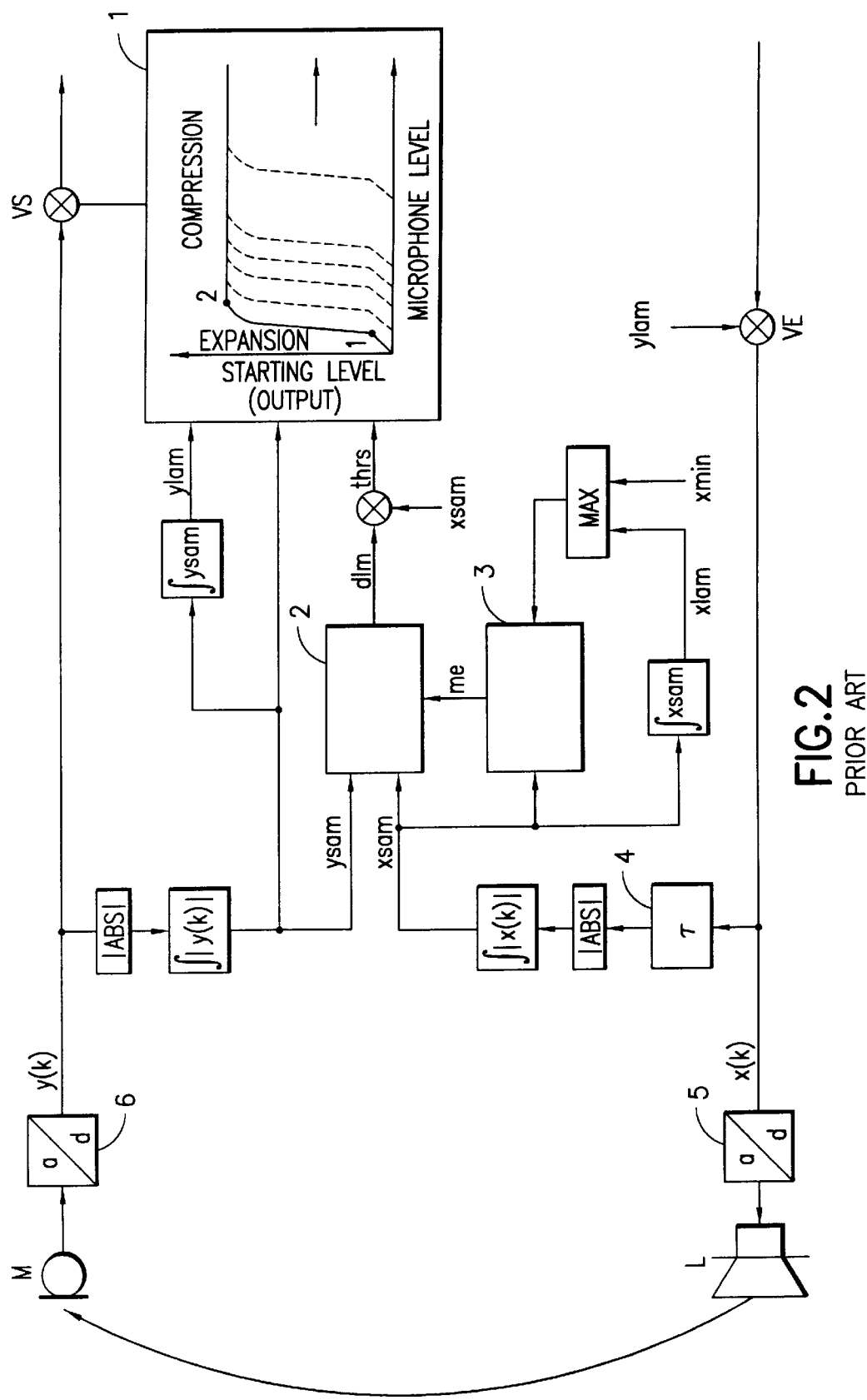
FIG. 2 a circuit arrangement to determine the transmitting and receiving gain of a single channel transmission system.

To better understand the hands-free communication method for multichannel transmission systems, the known hands-free communication method for a single channel transmission system is explained in accordance with FIG. 2. FIG. 2 illustrates a transmitting branch with one microphone M, a receiving branch with one loudspeaker L, a circuit arrangement to determine the coupling factor dlm with a coupling estimator 2, and a control device 3 as well as a compander 1, whose transmission curve can be shifted for a short time as a function of the acoustical ambient conditions, thus influencing the transmission gain VS.

The current coupling factor dlm can be determined from the ratio of the short-time average ysam of the scanning value of the transmitted signal y(k) and the short-time average xsam of the scanning value of the received signal x(k) in accordance with equation (1).

$$dlm = f \| ysam/xsam \| \quad (1)$$

The short-time average of the scanning value of the transmitted signal ysam is composed of the sum of the local signal levels and the sidetone signal going from loudspeaker L to microphone M. However, a useable measurement of the coupling factor is only possible when the local speaker is not speaking and suitable signals are received from remote subscribers. In this way the coupling estimator 2 is controlled by the control device 3.

To form the ratio of respective signals according to equation (1), a delay line 4 bridges the time required by the received signal x(k) to go from a D/A transducer 5 via the path from loudspeaker L to microphone M, and to an A/D transducer 6. The delay time $\tau$ must be dimensioned so that the sidetone signal reaches the coupling estimator 2 before or at the same time as the delayed received signal. When selecting the integration limits during integration of the amounts of the scanning values of the received signal x(k) and the transmitted signal (y(k), a tolerance window of about a 5 m path can be realized between the loudspeaker L and the microphone M in accordance with the acoustical running time.

The control device 3 determines the conditions under which an evaluation of the quotient described by equation (1) can take place. From the short-time average of the scanning value of the received signal xsam, the long-term average value of the received signal xlam is formed through integration. As an alternative to the integration of the long-term average value of the received signal xsam, a minimum value detector can be used, as illustrated by package unit 5.13 in FIG. 4. Such a minimum value detector detects the smallest short-term average of the scanning value of the received signal min(xsam), and holds it for a time interval of 5 s, for example. The result is the possibility of differentiating speech, which is generally distinguished by high dynamics, from a generally more uniform ambient noise. If the short-term average value of the received signal xsam is greater than the long-term average value of the received signal xlam, it is an indication that the remote subscriber is talking, and the briefly changing voice level separates from the noise level. To prevent a coupling factor computation from already taking place in a very quiet environment with a small short-term average value of the received signal xsam, which need not necessarily come from a voice signal, an additional decision threshold xmin is established, which the short-term average value of the transmitted signal xsam must exceed. The condition (2a) or (2b) for a release me to calculate the current coupling factor dlm is therefore:

$$me = \begin{Vmatrix} \|1 \text{ if } xsam > xlam \text{ and } xsam > xmin \\ \|0 \text{ if } xsam \le xlam \text{ or } xsam \le xmin \end{Vmatrix} \quad (2a)$$

or $$me = \begin{Vmatrix} \|1 \text{ if } xsam > \min(xsam) \text{ and } xsam > xmin \\ \|0 \text{ if } xsam \le \min(xsam) \text{ or } xsam \le xmin \end{Vmatrix} \quad (2b)$$

The coupling factor dlm is weighted with the short-term average value of the received signal xsam, and the resulting signal thrs determines the brief shifting of the transmission curve of compander 1. With a fixed coupling between loudspeaker L and microphone M, i.e. a large coupling factor dlm, the transmission curve of compander 1 is briefly shifted to the right, so that the echo signals arriving at the microphone M are not amplified, and are therefore suppressed. With the long-term average value of the transmitted signal ylam obtained by integration of the short-term average value of the transmitted signal ysam, the transmission curve of compander 1 is adjusted as a function of current ambient noise, and the gain VC is determined in the receiving branch. In order not to transmit the ambient noise to the receiver, with increasing ambient noise, i.e. with an increasing long-term average value ylam, the transmission curve of compander 1 is shifted to the right, to adjust the transmission gain VS so that the ambient noise level must be exceeded, in order to send a signal to the receiver.

The coupling estimator 2 in FIG. 2 is now explained in greater detail in the following, with the help of FIG. 3 and FIG. 4. For reasons of clarity, a differentiation between the short-term average value of the received signal xsam and the delayed short-term average value of the received signal xsamd was omitted in FIG. 2; this differentiation is taken into account in FIG. 4.

Figure 4:
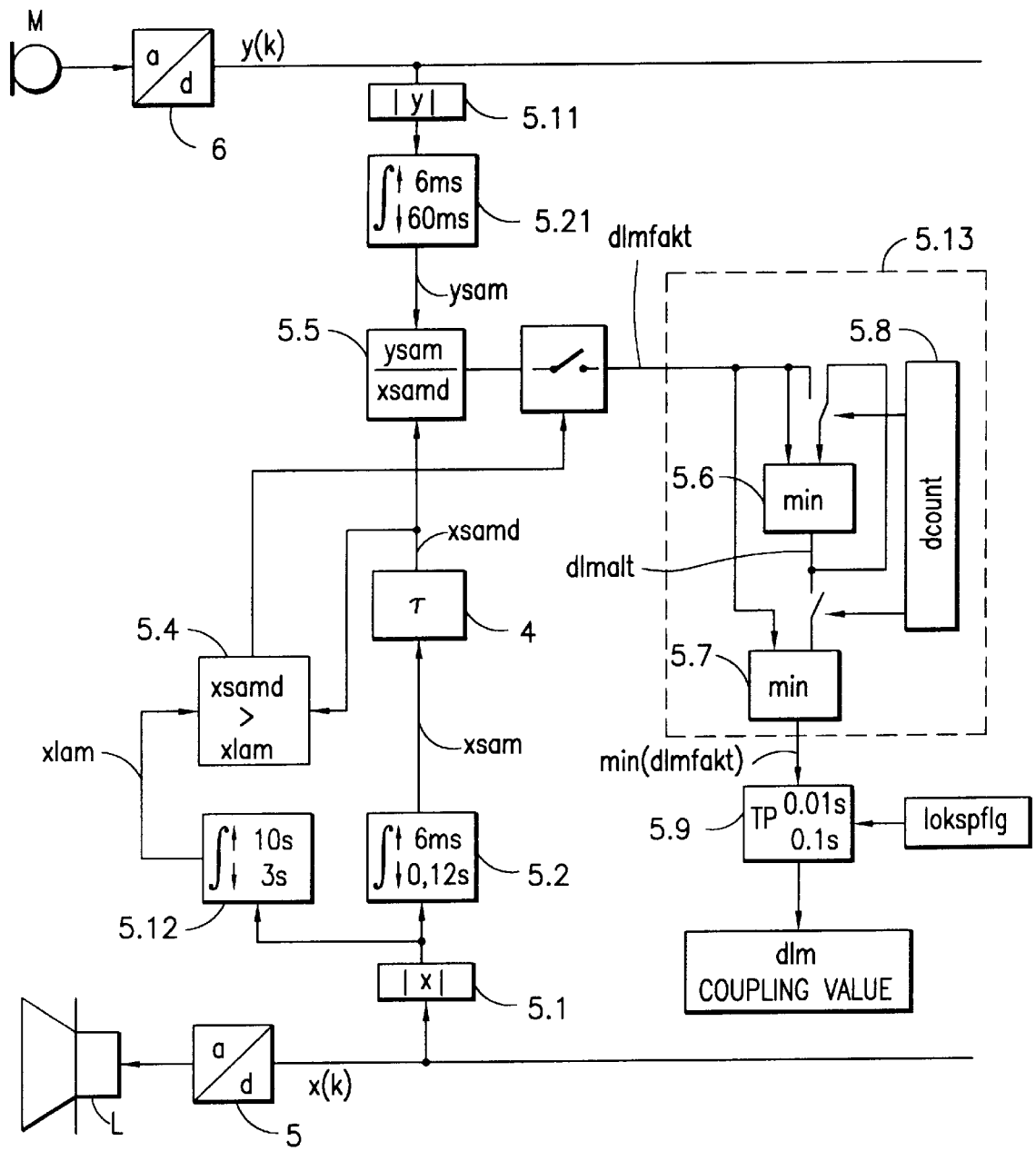
FIG. 4 a circuit arrangement to estimate the acoustic coupling factor.

According to FIG. 4, first the short-term average value of the transmitted signal ysam is determined from the scanning value of the transmitted signal y(k) at microphone M, by the formation of amount 5.11 and the subsequent integration 5.21. In the same way, the short-term average value of the received signal xsam is determined from the scanning value of the received signal x(k) at loudspeaker L, by the formation of amount 5.1 and a subsequent first integration 5.2, as well as the subsequent second integration 5.12 of the long-term average value of the received signal xlam. For the reasons already explained above, the short-term average value of the received signal xsam is delayed by a delay circuit 4, which produces the delayed short-term average value xsamd. Now, in accordance with $$\text{ysam}/\text{xsam} = \text{dlmfakt} \quad (3)$$

a quotient is formed by a quotient former 5.5 from the thus obtained signals, which produces a coupling signal dlmfakt. This coupling signal dlmfakt is prone to errors particularly through local sounds, such as duplex communication for example, and is not yet suited in this form as a measure of the coupling factor.

Figure 3:
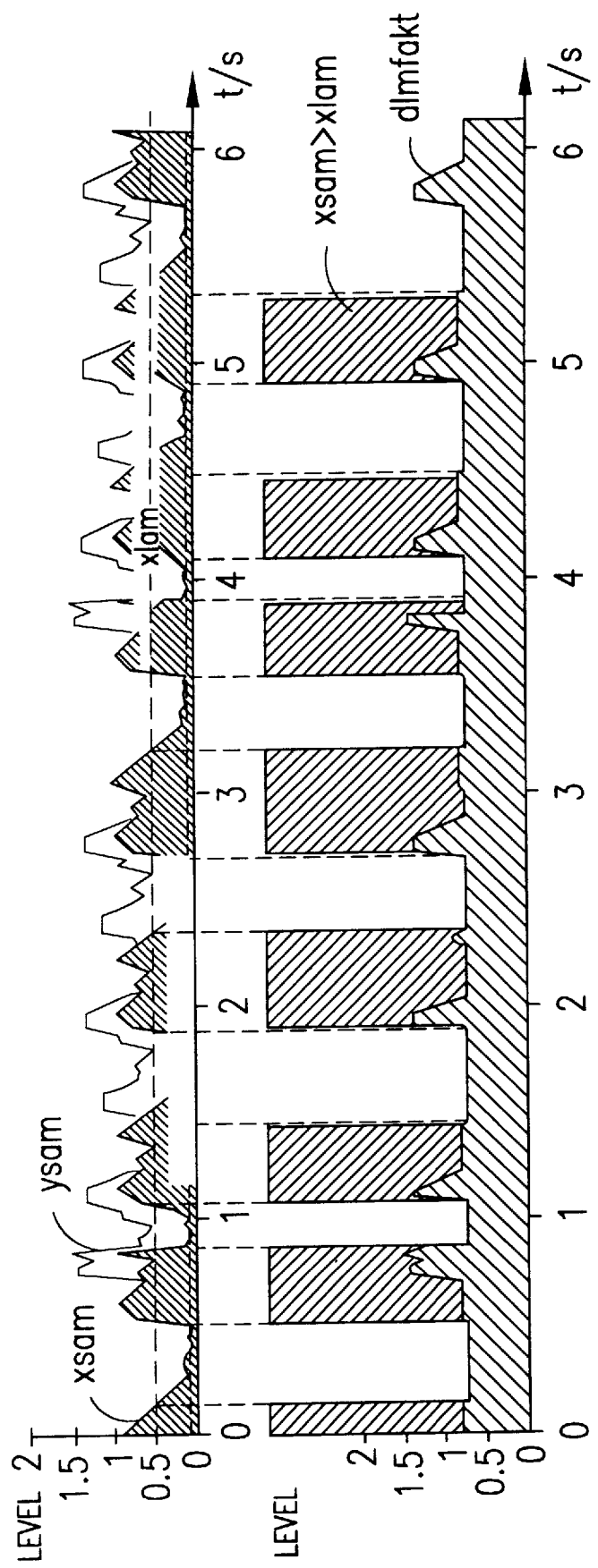
FIG. 3 a time diagram to represent a duplex situation.

In the lower section, FIG. 3 illustrates the variation with time of the coupling signal dlmfakt for a duplex situation. At first, only the coupling signals dlmfakt in which the delayed short-term average value of the received signal xsamd is greater than the long-term average value of the received signal xlam, are evaluated further. In the case without duplex communication, the division according to equation (3) always produces smaller values than with duplex communication. However, duplex communication takes place in limited time, because the local speaker as well as the remote speaker insert word and sentence pauses during speech. Now, if only the smallest values of the results of the division are used to determine the coupling factor dlm within a time interval, for example 5 s, there is a very high probability of a correct measurement. To determine the smallest value of the coupling signal dlmfakt, this coupling signal dlmfakt is supplied to a minimum-value detector 5.13. The minimum-value detector 5.13 comprises a first memory and comparator circuit 5.6, and a second downstream memory and comparator circuit 5.7, as well as a counter 5.8. During a time interval determined by the counter 5.8, the output signal dlmalt of the first memory and comparator circuit 5.6 is constantly reset to the lower value of dlmalt and dlmfakt, and in this way the first memory and comparator circuit 5.6 seeks out the smallest value during the time interval. When the counter 5.8 is reset, this value dlmalt is taken over by the second memory and comparator circuit 5.7, while the output signal dlmalt of the first memory and comparator circuit 5.6 is adjusted for the current coupling signal dlmfakt, in order to seek out the lowest value again during the following time interval. The second memory and comparator circuit 5.7 compares the instantaneous value of the coupling signal dlmfakt with the stored output signal dlmalt of the first memory and comparator circuit 5.6. The second memory and comparator circuit 5.7 takes over the smaller value, in order to find the smallest possible value min(dlmfakt) as fast a possible. The output signal min(dlmfakt) of the second memory and comparator circuit 5.7 is filtered by a low-pass filter 5.9, and then supplies the best estimate for the coupling factor dim. The time constant of the low-pass filter 5.9 is significantly increased by a signal lokspflg, for example by a factor of 10, to keep an increase in the time constant during duplex communication small, and to enable an increase in the time constant during system changes, for example with a larger coupling factor.

Figure 5:
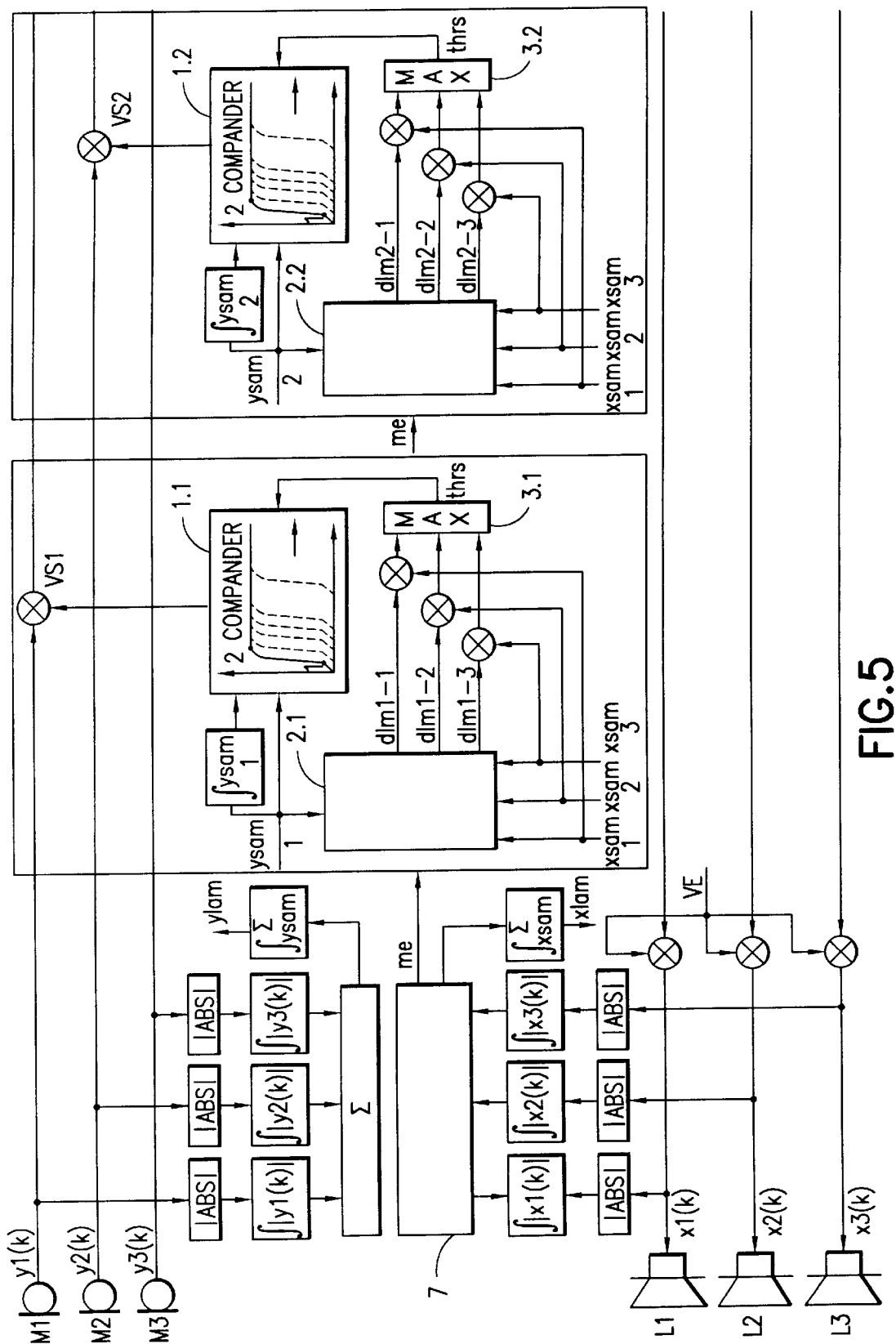
FIG. 5 a circuit diagram for a three-channel hands-free communication arrangement according to the method of the invention.

FIG. 5 illustrates a system arrangement for a multichannel hands-free communication with the example of a three-channel arrangement. A microphone M1, M2, M3 is provided for each local subscriber. The installation place of the respective microphone M1, M2, M3 corresponds to the installation place of the respective loudspeaker at the far end of the transmission system, where a corresponding hands-free communication arrangement is located. Each remote subscriber is reproduced accordingly by a loudspeaker L1, L2, L3, whose installation place reproduces the location of the subscriber at the far end. The arrangement according to FIG. 5 comprises a circuit portion for determining the averages of the scanning values of the transmitted signals y1(k), y2(k), y3(k), and the averages of the scanning values of the received signals x1(k), x2(k), x3(k), from an evaluation circuit 7, and for each microphone M1, M2, M3 with a similar circuit to determine the coupling factors and the transmission gain computations of M1, M2 and M3. For reasons of clarity, the D/A transducers preceding the loudspeakers L1, L2, L3, and the A/D transducers following microphones M1, M2, M3, are not illustrated in FIG. 5. The gain factors for the transmitted signals VS1, VS2, VS3 are calculated separately for each microphone M1, M2, M3. This achieves an individual noise suppression as well as an optimum adaptation to the speaker.

The respective short-term averages ysam1, ysam2, ysam3 are formed from the scanning values of the transmitted signals y1(k), y2(k), y3(k), by formation of the amounts and a subsequent integration, and the long-term average value of the transmitted signals ylam results from the integration of the sum of these short-term average values. In the same way, the respective short-term averages xsam1, xsam2, xsam3 are formed from the scanning values of the received signals x1(k), x2(k), x3(k) by formation of the amounts and a subsequent integration, and the long-term average value of the received signals xlam results from the integration of this sum of the short-term average values. The conditions for determining the coupling factors, and the coupling factors themselves, are determined with the help of these average values. According to equation (1), the nine coupling factors between loudspeakers L1, L2, L3 and microphones M1, M2, M3 are determined from the short-term average values, namely for the first microphone M1:

$$\text{dlm } 1\text{-}1 = f_{11} \| ysam1/xsam1 \|$$

$$\text{dlm } 1\text{-}2 = f_{12} \| ysam1/xsam2 \|$$

$$\text{dlm } 1\text{-}3 = f_{13} \| ysam1/xsam3 \| \quad (4)$$

and accordingly for other microphones, for example for the third microphone M3:

$$\text{dlm } 3\text{-}1 = f_{31} \| ysam3/xsam1 \|$$

$$\text{dlm } 3\text{-}2 = f_{32} \| ysam3/xsam2 \|$$

$$\text{dlm } 3\text{-}3 = f_{33} \| ysam3/xsam3 \| \quad (5)$$

To compute the different coupling factors, first the evaluation circuit 7 determines the largest short-term average value xmax, and its location, from the short-term average values of the received signals xsam1, xsam2, xsam3. In this way, a suitable received signal for computing the coupling factor is obtained from a momentarily active loudspeaker. However, if several loudspeakers are active simultaneously, the difference between the largest short-term average value xmax and the individual short-term average values xsam1, xsam2, xsam3 is smaller than with only one active loudspeaker, since one microphone receives several loudspeaker signals in that case. This difference must exceed a certain threshold xdiff, so that a correct coupling factor computation can be performed. The computation is not performed when several loudspeakers are active. The threshold xdiff establishes the accuracy of the coupling factor determination. With the conditions already explained for the single channel hands-free communication method for a release me to calculate the current coupling factor according to equations (2a) and (2b), the following conditions result for the multichannel hands-free communication method according to equations (6a) or (6b):

$$me = \begin{Vmatrix} 1 \text{ if } xsam > xlam \text{ and } xsam > xmin \\ \text{and } (xmax - xsamq) > xdiff \\ 0 \text{ if } xsam \le xlam \text{ or } xlam \le xmin \\ \text{or } (xmax - xsamq) \le xdiff \end{Vmatrix} \quad (6a)$$

where xsamq with q=1, 2, 3, . . . is the second largest value after xmax.

$$me = \begin{Vmatrix} 1 \text{ if } xsam > \min(xsam) \text{ and } xsam > xmin \\ \text{and } (xmax - xsamq) > xdiff \\ 0 \text{ if } xsam \le \min(xsam) \text{ or } xsam \le xmin \\ \text{or } (xmax - xsamq) \le xdiff \end{Vmatrix} \quad (6b)$$

where xsamq with q=1, 2, 3, . . . is the second largest value after xmax.

The difference $\Sigma xsam - xmax$ can also be formed instead of the difference xmax−xsamq. A small difference shows that the sum $\Sigma xsam$ is preponderantly produced by xmax. This means that only one loudspeaker is active, and a sure computation of the coupling factor is thereby made possible. Equations (7a) or (7b) then apply for the release me of the computation:

$$me = \begin{Vmatrix} 1 \text{ if } xsam > xlam \text{ and } xsam > xmin \\ \text{and} \left( \sum xsam - xmax \right) < xdiff \\ 0 \text{ if } xsam \le xlam \text{ or } xsam \le xmin \\ \text{or} \left( \sum xsam - xmax \right) \ge xdiff \end{Vmatrix} \quad (7a)$$

$$\text{or } me = \begin{Vmatrix} 1 \text{ if } xsam > \min(xsam) \text{ and } xsam > xmin \\ \text{and} \left( \sum xsam - xmax \right) < xdiff \\ 0 \text{ if } xsam \le \min(xsam) \text{ or } xsam \le xmin \\ \text{or} \left( \sum xsam - xmax \right) \ge xdiff \end{Vmatrix} \quad (7b)$$

Figure 6:
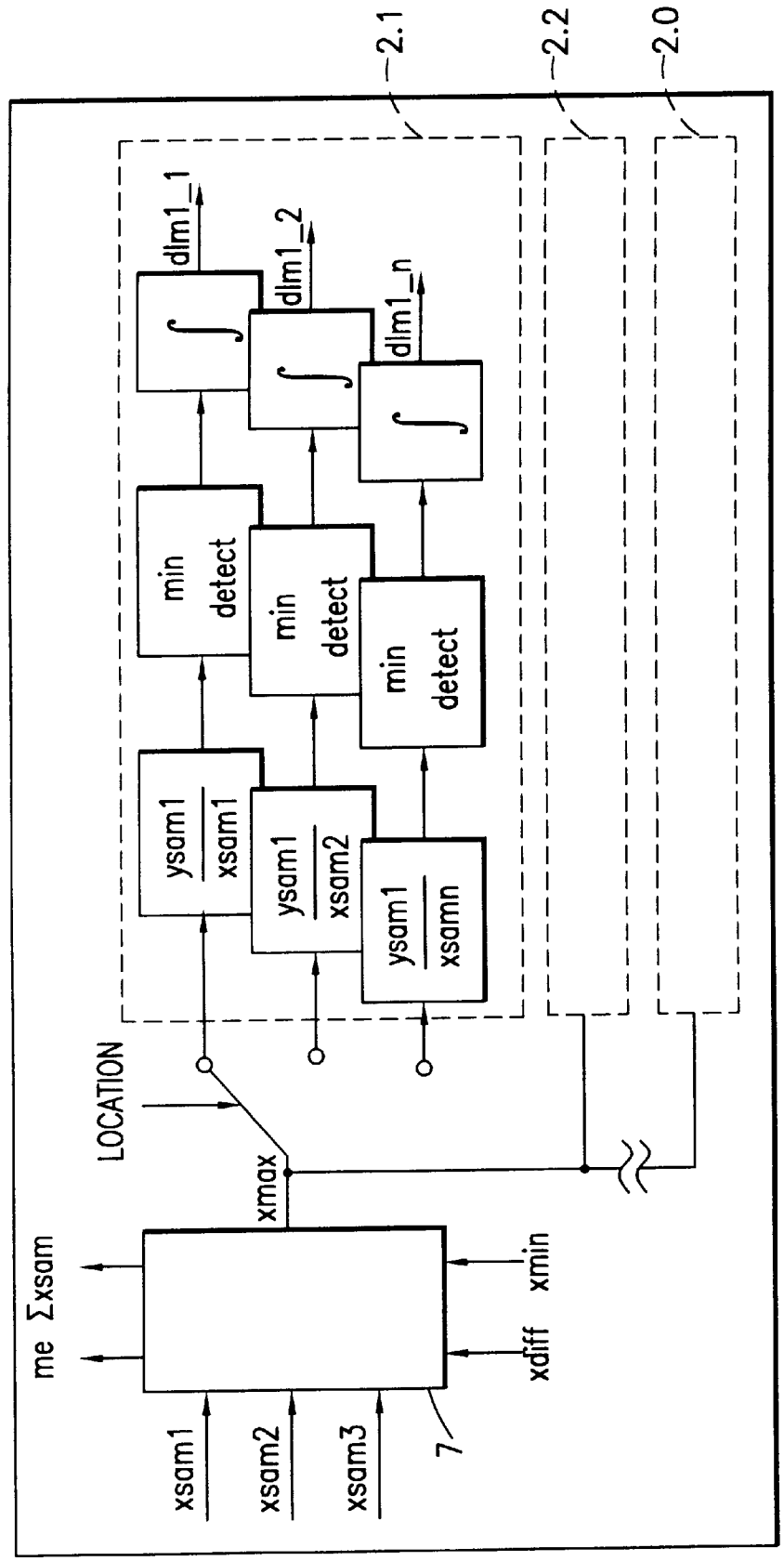
FIG. 6 a block circuit diagram for estimating the coupling factor according to the invention for a three-channel transmission system.

When me=1, the computation of the coupling factors is performed separately for each microphone. FIG. 6 is a detailed depiction of the coupling estimator 2.1 for the first microphone M1, a depiction of the coupling estimator 2.2 for the second microphone M2, and a depiction of the coupling estimator 2.n for the nth microphone Mn. The computation of the current coupling factor takes place with the minimum value detectors min detect illustrated in FIG. 4, and described in detail. The computed coupling factors determine the factor with which the pertinent short-term average value of the received signal xsam is weighted, for example for the first microphone M1:

$$\text{thrs11} = \text{dlm } 1\text{-}1 \cdot xsam1$$

$$\text{thrs12} = \text{dlm } 1\text{-}2 \cdot xsam2$$

$$\text{thrs13} = \text{dlm } 1\text{-}3 \cdot xsam3 \quad (8)$$

With a first maximum value decider 3.1 for the first microphone M1, and according to a second maximum value decider 3.2 for the second microphone M2, the maximum value of the weighted coupling factors is determined, and a brief shifting of the transmission curve of the respective compander 1.1, 1.2 is then performed with them, thus determining the respective transmission gain VS1, VS2. In this way, the largest current coupling is always in effect for shifting the transmission curve, so that the stability of the transmission systems is ensured. Since the coupling factors dlm 1-1 to dlm 3-3 are always determined individually, the smallest possible influence on the duplex communication is achieved. Because of the noise suppression at every microphone by shifting the transmission curve of the compander according to the long-term average value of the transmitted signal ylam, a large number of subscribers is made possible without detriment to the signal-to-noise ratio. In addition the acoustical liveliness, which is created by the acoustical coupling of the respective speaker to neighboring microphones, is diminished. The long-term average value of the transmitted signal ylam determines the gain in the receiving branch VE. As depicted in FIG. 5, the gain is individually adjusted for all transmission branches. However, it is also possible to adjust the gain separately for each receiving branch by means of the long-term average values of the individual transmitting branches ylam1, ylam2, ylam3. This is particularly useful when the locations of the subscribers are far from each other and the noise situation is different at each location.

Figure 7:
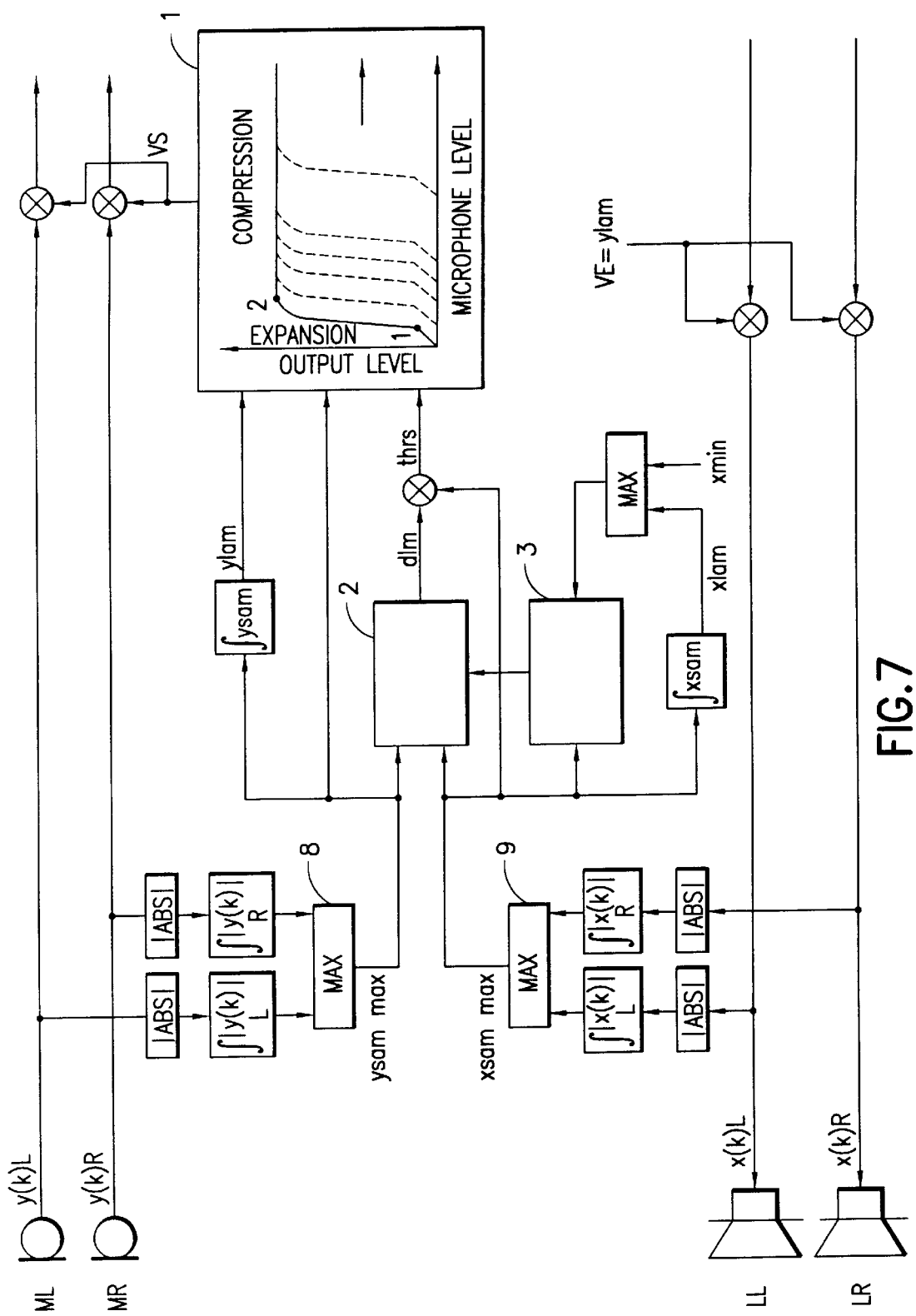
FIG. 7 a circuit arrangement for stereophonic hands-free communication.

A special case of multichannel hands-free communication is stereophonic hands-free communication with a hands-free communication device according to FIG. 7. The loudspeakers LL, LR and microphones ML, MR used for the left and right channels are placed symmetrically. Different speaker locations are represented by differences in level and running time between the left and the right signal. To maintain the stereo basis locally and for the remote subscriber, the channels of the receiving branch and the channels of the transmitting branch must be operated at the same respective gain VE, VS during stereophonic hands-free communication. As described for the multichannel hands-free communication, it is basically possible to compute the four coupling factors taking place with stereophonic arrangements dlm ML-LL, dlm ML-LR, dlm MR-LL, dlm MR-LR separately. But, since the arrangement of microphones and loudspeakers is symmetrical, the acoustical coupling between loudspeakers LL, LR and microphones ML, MR can be described with only one coupling factor dlm, if the respective dominant short-term average value of the transmitted signal and the received signal ysammax, xsammax is used to compute the coupling factor dlm, thereby determining the most unfavorable coupling factor. In this way, the short-term average values ysamL, ysamR are formed by integrating the amounts of the scanning values of transmitted signals y(k)L, y(k)R, and are compared with each other by a maximum value decider 8. The larger value ysammax is used to compute the current coupling factor dlm, and after integration is used as the long-term average value ylam for shifting the transmission curve of compander 1, and thus for adjusting the transmission gain VS. In the same way, the short-term average values ysamL, ysamR are formed by integrating the amounts of the scanning values of received signals x(k)L, x(k)R, and are compared with each other by another maximum value decider 9. The larger value xsammax is used for computing the current coupling factor dlm, and for weighting the coupling factor dlm to determine the shift of the transmission curve of compander 1, and after integration for the long-term average value xlam, as a measure of the received noise level.

By comparison with known multichannel hands-free communication methods with FIR filters, the method according to the invention can be realized at lower cost. Computing the individual coupling factors is much simpler than determining the FIR filter coefficients. By shifting the transmission curve of the respective compander 1.1, 1.2, which is determined by the weighted coupling factors shown in FIG. 5, a total attenuation of the ambient noise and echoes is achieved. The response threshold of the compander's transmission curve is determined by the ambient noise, and with acoustical echoes the transmission curve is automatically and briefly shifted to the right as indicated in the figures, so that the echoes are not transmitted.

What is claimed is:

1. A hands-free communication method for a multichannel transmission system comprising a plurality of transmit channels each including a microphone as an acoustical-to-electrical transducer and a plurality of receive channels each including a loudspeaker as an electrical-to-acoustical transducer, said hands-free communication method using a controllable compander (1, 1.1, 1.2) in each transmit channel to determine the magnitude of the transmit gain and a coupling estimator (2) for single-channel transmission which serves to determine the acoustic coupling between loudspeaker and microphone, characterized in that between each microphone (M1, M2, M3, . . . , Mn) and each loudspeaker (L1, L2, L3, . . . , Ln) the respective acoustic coupling factors (dlm 1-1, dlm 1-2, dlm 1-3, . . . , dlm 1-n; dlm 2-1, dlm 2-2, dlm 2-3, . . . , dlm 2-n; . . . ; dlm n-1, dlm n-2, dlm n-3, . . . , dlm n-n) and the respective acoustic coupling factors (dlm 1-1, dlm 1-2, dlm 1-3, . . . , dlm 1-n) determined for a single microphone (M1) are weighted with the short-time average value of the received signal (xsam1, xsam2, xsam3, . . . , xsamn) of the loudspeaker (L1, L2, L3, . . . , Ln) associated with the respective acoustic coupling factor (dlm 1-1, dlm 1-2, dlm 1-3, . . . , dlm 1-n) of said single microphone (M1), and that the maximum value determined therefrom serves as a control quantity (thrs) for the transfer function of the respective compander (1.1, 1.2, 1.3, . . . , 1.n) associated with the transmit channel of each microphone (M1, M2, M3, . . . , Mn), so that the gain of each transmit channel (VS1, VS2, VS3, . . . , Vsn) is controlled separately.

2. A hands-free communication method as claimed in claim 1, characterized in that, to determine the acoustic coupling factors, the maximum short-time average value (xmax) of the short-time average values (xsam1, xsam2, . . . , xsamn) of the sampled signals (x1(k), x2(k), . . . , xn(k)) is computed and the receive channel (location) belonging to said maximum short-time average value (xmax) is determined, and that then the current coupling factors between the receive-channel-terminating loudspeaker and the microphones (M1, M2, . . . , Mn) are calculated.

3. A hands-free communication method as claimed in claim 2, characterized in that, to calculate the current acoustic coupling factor (dlm), the instantaneous value of the acoustic coupling (dlmfakt) between a loudspeaker and a microphone is determined by forming the quotient of the corresponding short-time average value of the transmitted signal (ysam) and the corresponding short-time average value of the received signal (xsam), and that the current acoustic coupling factor (dlm) is determined with a first minimum-value detector (5.13) in which a first memory and comparator circuit (5.6) determine the smallest acoustic coupling value (dlmalt) in a time interval determined by a counter (5.8) and transfer said smallest acoustic coupling value to a second memory and comparator circuit (5.7) which compare the instantaneous value of the respective acoustic coupling (dlmfakt) with the smallest acoustic coupling value (dlmalt) from the first memory and comparator circuit (5.6) to find an absolute minimum acoustic coupling value (min(dlmfakt)), which is an optimum of the current acoustic coupling factor (dlm).

4. A hands-free communication method as claimed in claim 1, characterized in that the acoustic coupling factor between a loudspeaker and a microphone is only determined if the following conditions derived from the sample value of the received digital signal (x(k)) at the loudspeaker are fulfilled:

the short-time average value of the received signal (xsam) must be greater than the long-time average value of the received signal (xlam, i.e., xsam>xlam, or the short-time average value of the received signal (xsam) must be greater than the smallest short-time average value of the received signal (min (xsam)), i.e., xsam>min (xsam);

the short-time average value of the received signal (xsam) must exceed a defined threshold (xsam), i.e., xsam>xmin;

the difference between the largest of the short-time average values of the received signals (max (xsamq), with q=1, 2, . . . , n) at the loudspeakers and the second largest short-time average value (xsamq) must be greater than a defined threshold, i.e., (xmax−xsamq>xdiff.

5. A hands-free communication method as claimed in claim 1, characterized in that the acoustic coupling factor between a loudspeaker and a microphone is only determined if the following conditions derived from the instantaneous value of the received digital signal (x(k)) at the loudspeaker are fulfilled:

the short-time average value of the received signal (xsam) must be greater than the long-time average value of the received signal (xlam), i.e., xsam>xlam, or the short-time average value of the received signal (xsam) must be greater than the smallest short-time average value of the received signal (min (xsam)), i.e., xsam>min (xsam);

the short-time average value of the received signal (xsam) must exceed a defined threshold (xmin), i.e., xsam>xmin;

the difference between the sum of all short-time average values of the received signals (Σxsam) and the largest short-time average value of the received signals (xmax) must be less than a defined threshold, i.e., (Σxsam−xmax)<xdiff.

6. A circuit arrangement for carrying out a hands-free communication method for a multichannel transmission system using controllable companders (1.2., 1.2, . . . , 1.n) and coupling estimators (2.1, 2.2, . . . , 2.n), characterized in that each transmit channel is connected via an absolute-value device and an integrator to a summer having its output coupled to the respective receive amplifiers of the receive channels through a further integrator, that each receive channel is connected via an absolute-value device and an integrator to a weighting circuit (7) having its output (me) coupled to the coupling estimators (2.1, 2.2, . . . , 2.n) associated with the respective transmit channels, each of said coupling estimators (2.1, 2.2, . . . , 2.n) having its outputs connected to an associated maximum-value decision circuit (3.1, 3.2, . . . , 3.n), and that the output of the maximum-value decision circuit (3.1, 3.2, . . . , 3.n) is coupled to the control input of the compander (1.1, 1.2, . . . , 1.n) which determines the respective gain of the transmit channel.

\* \* \* \* \*